(12) United States Patent
Browne

(10) Patent No.: US 7,049,615 B1
(45) Date of Patent: May 23, 2006

(54) PORTABLE ULTRAVIOLET WATER PURIFIER

(76) Inventor: Warren G. Browne, H. H. Battles Buildings, 114 S. 12th St., Philadelphia, PA (US) 19107

( * ) Notice: Subject to any disclaimer, the term of this patent is extended or adjusted under 35 U.S.C. 154(b) by 0 days.

(21) Appl. No.: 11/110,411

(22) Filed: Apr. 21, 2005

(51) Int. Cl.
*B01D 17/06* (2006.01)
*B01D 35/00* (2006.01)

(52) U.S. Cl. .............................. 250/504 R; 250/504 H; 250/461.1; 210/256; 210/764; 210/765; 210/900; 422/1; 422/24; 422/186.3

(58) Field of Classification Search ..................... None
See application file for complete search history.

(56) References Cited

U.S. PATENT DOCUMENTS

| 4,141,830 A | * | 2/1979 | Last ............................ 210/748 |
| 4,623,467 A | * | 11/1986 | Hamlin ....................... 210/652 |
| 5,227,053 A | * | 7/1993 | Brym .......................... 210/143 |
| 5,843,309 A | * | 12/1998 | Mancil ........................ 210/205 |
| 6,773,608 B1 | * | 8/2004 | Hallett et al. ............... 210/748 |
| 2005/0139552 A1 | * | 6/2005 | Forsberg et al. ............ 210/748 |

\* cited by examiner

*Primary Examiner*—Nikita Wells
*Assistant Examiner*—Bernard E. Souw
(74) *Attorney, Agent, or Firm*—Zachary T. Wobensmith, III

(57) ABSTRACT

A portable ultraviolet water purifier is disclosed which has an outer housing defining a water chamber with a coupling for attachment to a faucet an inlet and an outlet with an ultraviolet light source therein.

5 Claims, 3 Drawing Sheets

PORTABLE ULTRAVIOLET WATER PURIFIER

BACKGROUND OF THE INVENTION

1. Field of the Invention

This invention relates to a portable ultraviolet water purifier of the self contained type which is intended to be attached to a spigot.

2. Description of the Prior Art

In the prior art, it has been known to use ultraviolet light to purify water. Most of the systems using ultraviolet light are stationary flow-through systems which include a chamber having an ultraviolet light source with a water inlet and outlet. The water to be treated flows through the chamber past the ultraviolet light source which destroys the various viruses, bacteria and some other contaminants. Flow-through systems are typically used in residences, and commercial buildings to provide safe drinking water. While these systems work well for such purposes, they are not portable, require a power supply and are not suitable for providing small quantities of clean water. Various devices to treat small quantities of water have been proposed such as in U.S. Pat. No. 6,110,424, which discloses a penlight sized ultraviolet light device, which is intended to be inserted into an open container containing water such as a cup. This is a fragile device with an exposed bulb and is not practical.

U.S. Pat. No. 6,579,495 B1 discloses a device similar to U.S. Pat. No. 6,110,424, except that it uses UV light emitting diodes, instead of a bulb. This device is also subject to the limitations of the device of U.S. Pat. No. 6,110,424.

U.S. Pat. No. 6,767,453 B2 discloses a portable container, which has a removable bottom to which an ultraviolet light source is attached.

The container is open at the top with a removable lid. This device does not provide a flow through system, is bulky, awkward to use, and does not lend itself to being easily stored and carried on an individual ready for use.

The portable ultraviolet water purifier of the invention can be easily carried by an individual and is not subject to the limitations of the prior art devices.

SUMMARY OF THE INVENTION

A portable ultraviolet water purifier is provided which is self contained, has an internal ultraviolet light source, and can be attached to a faucet, is battery operated, and can be easily carried by an individual ready for use.

The principal object of the invention is to provide a portable self-contained ultraviolet water purifier.

A further object of the invention is to provide a water purifier that is battery operated.

A further object of the invention is to provide a water purifier that is easily carried on and by an individual.

A further object of the invention is to provide a water purifier that may be attached to a spigot.

A further object of the invention is to provide a water purifier that is simple and inexpensive to construct, and lends itself to mass production.

A further object of the invention is to provide a water purifier that is durable and long lasting in use.

Other objects and advantageous features of the invention will be apparent from the description and claims.

DESCRIPTION OF THE DRAWING

The nature and characteristic features of the invention will be more readily understood from the following description taken in connection with the accompanying drawing forming part thereof in which.

It should, of course, be understood that the description and drawing herein are merely illustrative, and that various modifications and changes can be made in the structures, and embodiments disclosed without departing from the spirit of the invention.

DESCRIPTION OF THE PREFERRED EMBODIMENTS

When referring to the preferred embodiments, certain terminology will be utilized for the sake of clarity. Use of such terminology is intended to encompass not only the described embodiments, but also technical equivalents, which operate and function in substantially the same way to bring about the same result.

Figure 1:
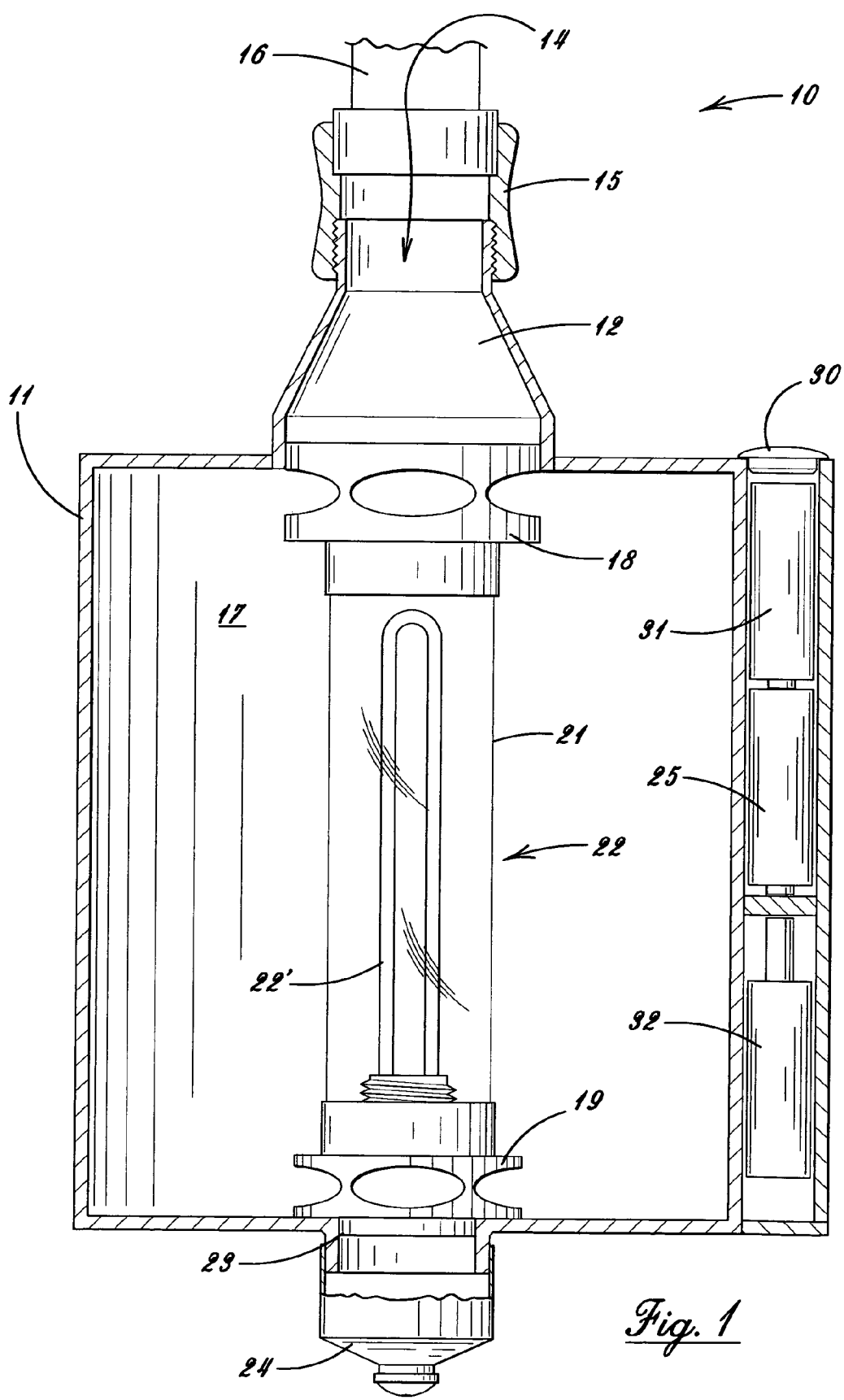
FIG. 1 is a front view in partial section of a water purifier in accordance with the invention.
Figure 2:
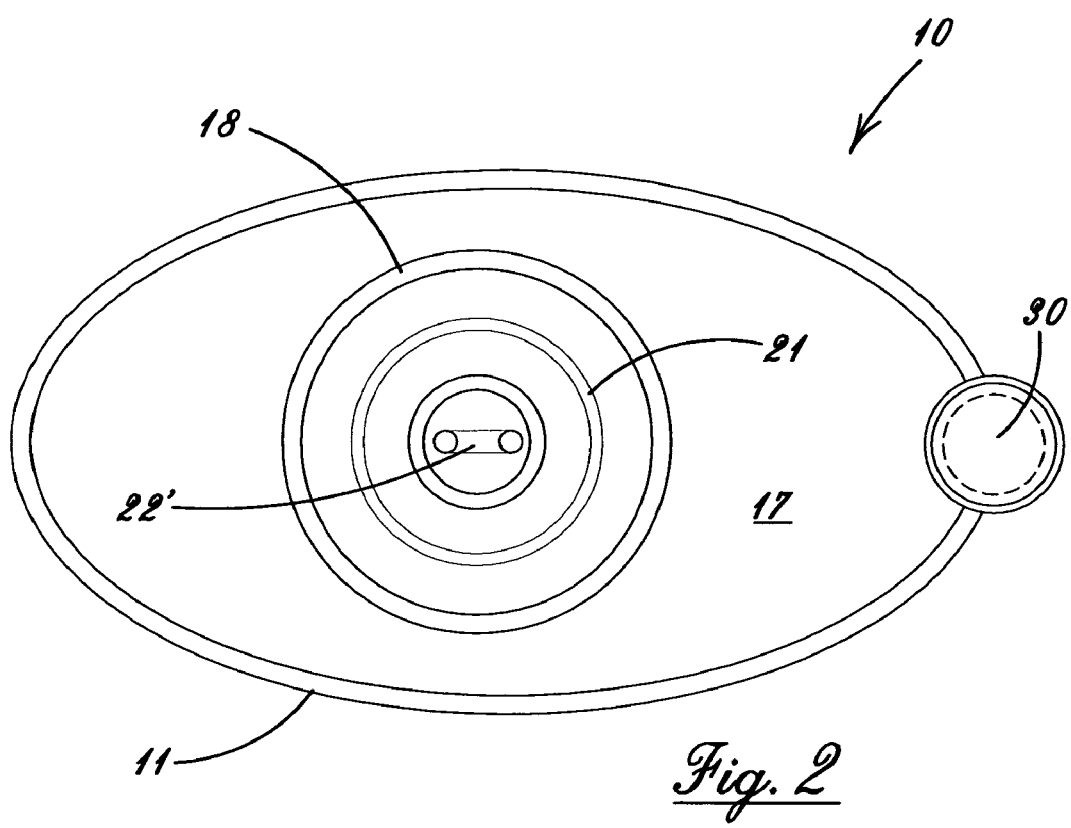
FIG. 2 is a horizontal sectional view taken approximately on the line 2—2 of FIG. 1.
Figure 3:
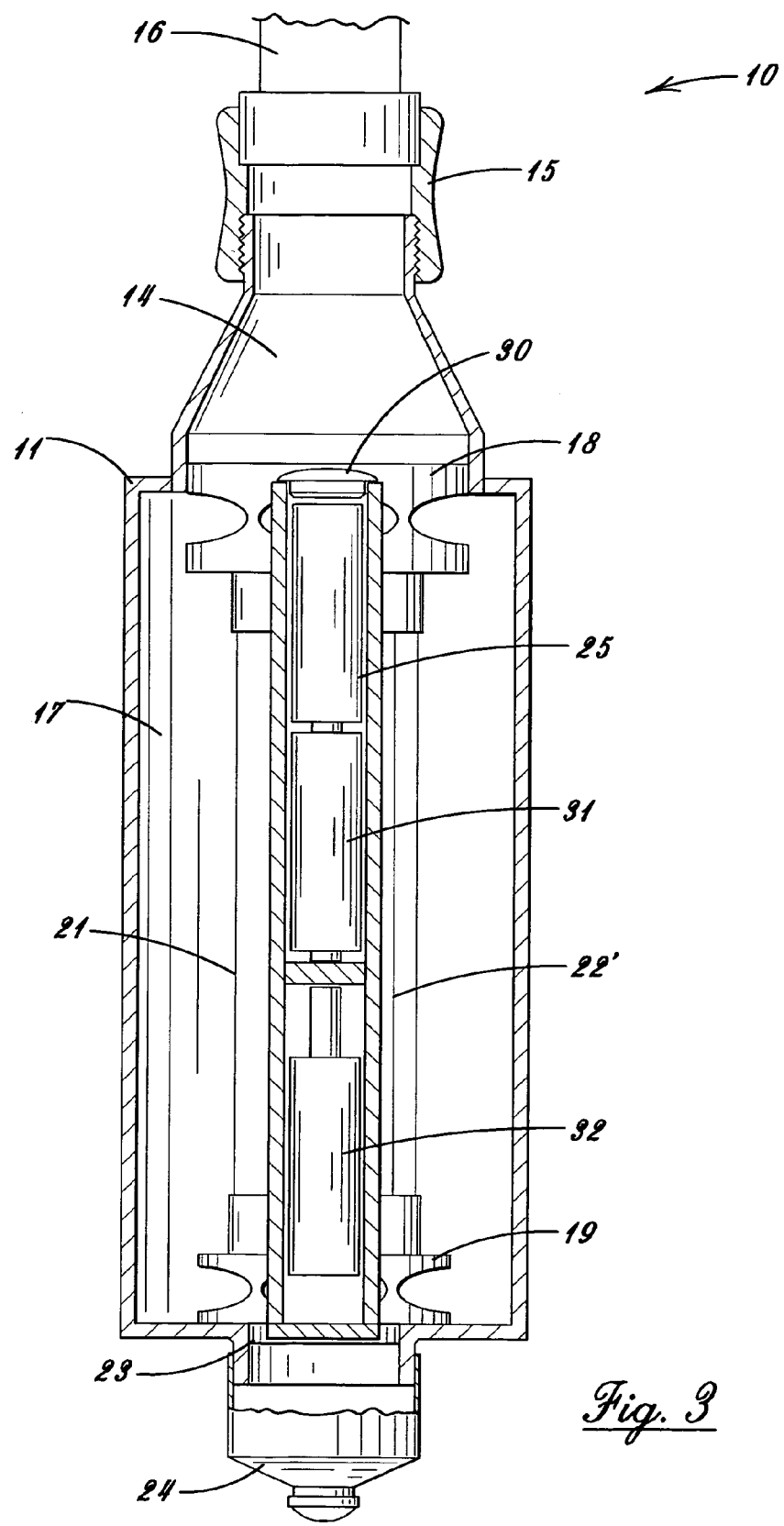
FIG. 3 is a side view in partial section of the water purifier of FIG. 1.

Referring now to the drawings and FIGS. 1–3, an ultraviolet water purifier 10 is illustrated. The purifier 10 has an outer housing 11 which can be of synthetic plastic, polyethylene plastic being particularly suitable. The outer housing 11 is of an oval configuration with a funnel shaped inlet 12 open at the top 14, which can be provided with a cap (not shown) to seal the inlet 12 when not in use. The inlet 12 has a faucet coupling 15 attached thereto and illustrated as connected to a faucet 16, which communicates with a source of water (not shown) to be disinfected.

The outer housing 11 forms a water chamber 17, which has an upper sleeve housing 18 and a lower sleeve housing 19 of hollow configuration to allow water to pass therethrough into and out of chamber 17.

The upper and lower sleeve housing 17 and 18 carry an ultraviolet light source 22 which is water resistant and includes an outer quartz sleeve 21, and an ultraviolet bulb 22, both of well known type and available from topbulb, 5204 Indianapolis Blvd., East Chicago, Ind. 46312-3838.

The lower sleeve 18 extends through an opening 23 in outer housing 11 with an end cap 24 detachably connected thereto to permit sealing and upon removal to allow disinfected water to flow throughout to be described. The outer housing 11 has a removable housing 25 thereon which has an on-off switch 30, a battery 31, and a transformer 32. The battery 31, transformer 32, on-off switch 30, and ultraviolet light source 22 are connected together by a conventional circuitry (not shown).

In use the faucet coupling 15 is attached to the faucet 16, and the water chamber 17 filled with water. The on-off switch 30 is activated to energize the ultraviolet light bulb 22 and the water is disinfected. When the disinfection is complete, the switch 30 is activated and the light bulb 22 turned off. If desired, the faucet coupling 15 can be disengaged from the faucet 16 and the cap (not shown) applied to seal off the inlet 12. The purifier 10 can then be transported for use as designed. Alternatively, the purifier 10 can remain connected to the faucet 16 and the end cap 24 detached to allow disinfected water to flow out the lower sleeve 21.

It will thus be seen that the objects of the invention have been achieved.

I claim:

1. A portable ultraviolet water purifier which comprises,
   an outer housing forming a water chamber and having an inlet and an outlet,
   said inlet of funnel shaped configuration open at the top,
   a faucet coupling attached to said inlet for connection to a faucet,
   an upper hollow sleeve housing in said inlet in communication therewith,
   a lower hollow sleeve housing in the outer housing,
   an ultraviolet light source in said chamber carried in said upper and lower sleeve housings, and,
   battery means to provide electrical power to selectively energize said ultraviolet light source.

2. A portable ultraviolet water purifier as defined in claim 1 in which, said inlet has a detachable cap for sealing.

3. An ultraviolet water purifier as defined in claim 1 in which,
   said ultraviolet light source has an outer quartz sleeve and an ultraviolet light bulb inside said sleeve.

4. An ultraviolet water purifier as defined in claim 1 in which,
   said lower sleeve housing has a detachable end cap.

5. An ultraviolet water purifier as defined in claim 1 in which,
   said outer housing is of synthetic plastic.

\* \* \* \* \*